(12) United States Patent
Guan et al.

(10) Patent No.: US 11,418,718 B2
(45) Date of Patent: Aug. 16, 2022

(54) VIDEO CAMERA

(71) Applicant: HANGZHOU HIKVISION DIGITAL TECHNOLOGY CO., LTD., Hangzhou (CN)

(72) Inventors: Hongjie Guan, Hangzhou (CN); Yan Wu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 279 days.

(21) Appl. No.: 16/769,961

(22) PCT Filed: Aug. 3, 2018

(86) PCT No.: PCT/CN2018/098476
§ 371 (c)(1),
(2) Date: Jun. 4, 2020

(87) PCT Pub. No.: WO2019/114285
PCT Pub. Date: Jun. 20, 2019

(65) Prior Publication Data
US 2020/0389597 A1    Dec. 10, 2020

(30) Foreign Application Priority Data
Dec. 12, 2017    (CN) .......................... 201721723216.6

(51) Int. Cl.
*H04N 5/232* (2006.01)
*H04N 5/225* (2006.01)
(Continued)

(52) U.S. Cl.
CPC ........... *H04N 5/23299* (2018.08); *G02B 7/02* (2013.01); *G02B 27/0006* (2013.01);
(Continued)

(58) Field of Classification Search
CPC ............ H04N 5/2254; H04N 5/22521; H04N 5/2252; G02B 7/022; G02B 7/026;
(Continued)

(56) References Cited

U.S. PATENT DOCUMENTS

| 5,240,220 A | 8/1993 | Elberbaum |
| 6,234,691 B1 * | 5/2001 | Jones ............... G08B 13/19632 348/143 |

(Continued)

FOREIGN PATENT DOCUMENTS

| CN | 201215984 | 4/2009 |
| CN | 101917545 | 12/2010 |

(Continued)

OTHER PUBLICATIONS

Extended European Search Report issued in Corresponding European Application No. 18889640.1, dated Dec. 17, 2020.

(Continued)

*Primary Examiner* — Pritham D Prabhakher
(74) *Attorney, Agent, or Firm* — Norton Rose Fulbright US LLP (57) ABSTRACT

Disclosed is a video camera, comprising a lens assembly, an upper shell assembly and a lower shell assembly. The upper shell assembly covers the lens assembly. The lens assembly is fixedly connected to the upper shell assembly, and both the lens assembly and the upper shell assembly are provided on the lower shell assembly so as to be rotatable in P-direction. The upper shell assembly is provided with a first protrusion, and the lower shell assembly is provided with a second protrusion, and the first protrusion and the second protrusion are press-fitted to each other so as to limit the rotation of the lens assembly in P-direction relative to the lower shell assembly. The rotation adjustment of the lens in P-direction can be realized by directly detaching the first (Continued)

protrusion from the second protrusion without removing the upper shell assembly from the lens assembly, which is convenient to operate.

7 Claims, 5 Drawing Sheets

(51) Int. Cl.
*G02B 7/02* (2021.01)
*G02B 27/00* (2006.01)

(52) U.S. Cl.
CPC ......... *H04N 5/2252* (2013.01); *H04N 5/2254* (2013.01); *H04N 5/22521* (2018.08)

(58) Field of Classification Search
CPC ...... G02B 7/023; G02B 7/02; G02B 27/0006; F16M 11/2014; F16M 11/18; F16M 11/10; F16M 13/027; F16M 2200/024; G08B 13/1963
USPC .......................................................... 359/811
See application file for complete search history.

(56) References Cited

U.S. PATENT DOCUMENTS

| 7,387,453 | B2 * | 6/2008 | Arbuckle | ......... G08B 13/19632 396/419 |
| 7,990,468 | B2 * | 8/2011 | Yamamoto | ........... H04N 5/2252 348/373 |
| 8,558,945 | B2 * | 10/2013 | Yamauchi | ........ G08B 13/19619 348/373 |
| 8,790,024 | B2 * | 7/2014 | Andersson | ............. G03B 37/02 396/427 |
| 9,042,714 | B2 * | 5/2015 | Aiba | .................. G08B 13/1963 396/20 |
| 9,565,345 | B2 * | 2/2017 | Mukai | ..................... G03B 17/02 |
| 9,952,485 | B1 * | 4/2018 | Luski | ................... G03B 17/561 |
| 10,196,007 | B2 * | 2/2019 | Nickolaou | .............. B60R 11/04 |
| 10,341,570 | B1 * | 7/2019 | Kong | ................. G08B 13/1963 |
| 2001/0047743 | A1 | 12/2001 | Raad et al. | |
| 2010/0225802 | A1 * | 9/2010 | Yamamoto | ....... G08B 13/19619 348/373 |
| 2011/0019074 | A1 * | 1/2011 | Lee | ...................... H04N 5/2251 348/373 |
| 2011/0096164 | A1 * | 4/2011 | Mori | ..................... G03B 17/56 348/143 |
| 2011/0310293 | A1 * | 12/2011 | Yamauchi | ........ G08B 13/19619 348/E5.026 |
| 2013/0287385 | A1 * | 10/2013 | Andersson | ........... H04N 5/2252 396/427 |
| 2014/0348498 | A1 * | 11/2014 | Aiba | ..................... G03B 37/02 396/79 |

FOREIGN PATENT DOCUMENTS

| CN | 104604211 | 5/2015 |
| CN | 204741501 | 11/2015 |
| JP | 2012032636 | 2/2012 |

OTHER PUBLICATIONS

International Search Report and Written Opinion issued in corresponding PCT Application No. PCT/CN2018/098476, dated Nov. 8, 2018 (English Translation of International Search Report Provided).

* cited by examiner

Fig.7

VIDEO CAMERA

CROSS REFERENCE TO RELATED APPLICATIONS

The present application is a national phase application under 35 U.S.C. § 371 of International Application No. PCT/CN2018/098476, filed Aug. 3, 2018, which claims the benefit of priority to Chinese patent application No. 201721723216.6 filed with the China National Intellectual Property Administration on Dec. 12, 2017 and entitled "video camera", each of which are incorporated herein by reference in their entirety.

TECHNICAL FIELD

The present application relates to the technical field of a monitoring device, and in particular to a video camera.

BACKGROUND

During the setting of a video camera, it is necessary to manually set the direction of the lens of the video camera. When the lens of the video camera needs to be adjusted in P-direction, it is necessary to remove a transparent cover from a lens assembly so that the lens in the lens assembly can be adjusted in the P-direction. This P-direction adjustment is rather complicated.

SUMMARY

The embodiments of the present application provide a video camera to overcome or at least mitigate at least one of the above-identified deficiencies of the prior art. The specific technical solutions are as follows:

An embodiment of the present application provides a video camera, including a lens assembly, an upper shell assembly and a lower shell assembly. The upper shell assembly covers the lens assembly. The lens assembly is fixedly connected to the upper shell assembly, and both the lens assembly and the upper shell assembly are provided on the lower shell assembly so as to be rotatable in P-direction. The upper shell assembly is provided with a first protrusion, and the lower shell assembly is provided with a second protrusion, and the first protrusion and the second protrusion are press-fitted to each other to limit the rotation of the lens assembly in the P-direction relative to the lower shell assembly.

In one embodiment, the first protrusion includes first teeth spaced apart in a circumferential direction of the upper shell assembly, and the second protrusion includes second teeth spaced apart in a circumferential direction of the lower shell assembly, and the first teeth and the second teeth are press-fitted to each other through engagement.

In one embodiment, there are at least two first teeth, and an interval between adjacent two of the second teeth is set to be greater than the width of one of the first teeth and less than the sum of the widths of two of the first teeth.

In one embodiment, three of the first teeth are uniformly spaced circumferentially on a bottom of the upper shell assembly, and the second teeth are disposed on an inner surface of a side wall of the lower shell assembly.

In one embodiment, the lower shell assembly includes a base and a lower shell. The lower shell is fixedly connected to a lower surface of the base, and the second protrusion is provided on an inner surface of a side wall of the lower shell, and the lens assembly is provided on an upper surface of the base so as to be rotatable in the P-direction.

In one embodiment, circumferential teeth are provided on the upper surface of the base. The P-direction adjustment mechanism of the video camera further includes a rotating support frame that includes a mounting portion and an elastic arm. Wherein the mounting portion is fixedly connected to the lower surface of the lens assembly, and the elastic arm extends in the P-direction to form a free end with a projection, and the circumferential teeth are frictionally engaged with the projection. When the lens assembly or the upper shell assembly is driven by a P-direction force exerted thereon, the circumferential teeth allow the projection to be detached from an gap between two adjacent circumferential teeth, which enables the lens assembly to rotate in the P-direction relative to the lower shell assembly.

In one embodiment, the P-direction adjustment mechanism of the video camera further includes an elastic sealing ring, which is disposed between the lens assembly and the base. A pressing force in a direction of a center line of a shaft is provided by the rotating support frame (4) and the base, so as to prevent water in the base (32) from entering the lens assembly via the lens assembly and the base.

In one embodiment, a base mounting portion is provided on the lower surface of the lens assembly, and the rotating support frame is sleeved outside the base mounting portion, which protrudes from the rotating support frame. The P-direction adjustment mechanism of the video camera further includes a pressing plate, which is disposed on the lower surface of the base and fastened on the base mounting portion by means of a screw.

In one embodiment, the upper shell assembly is a transparent cover, whose peripheral edge is fixedly connected to the lens assembly by means of a screw.

The video camera of the embodiments in the present application can directly detach the first protrusion from the second protrusion, so that a rotation adjustment of a lens in P-direction can be realized without removing the upper shell assembly from the lens assembly, which is convenient to operate.

BRIEF DESCRIPTION OF THE DRAWINGS

In order to more clearly describe the embodiments of the present application and the technical solutions of the prior art, drawings that need to be used in the embodiments and the prior art will be briefly described below. Obviously, the drawings provided below are for only some embodiments of the present application. Based on these drawings, other drawings can further be obtained by those skilled in the art without any creative efforts.

REFERENCE NUMERALS

| 1 | lens assembly | 2 | upper shell assembly |
|---|---|---|---|
| 3 | lower shell assembly | 4 | rotating support frame |
| 5 | elastic sealing ring | 6 | pressing plate |
| 7 | screw | 11 | base mounting portion |
| 12 | shaft | 13 | threaded hole structure |
| 21 | a first protrusion | 22 | threaded hole |
| 31 | a second protrusion | 32 | base |
| 33 | lower shell | 321 | circumferential teeth |
| 41 | mounting portion | 42 | elastic arm |
| 421 | projection | | |

DETAILED DESCRIPTION

In order to make the objectives, technical solutions, and advantages of the present application more clear, the present application will be described in more detail with reference to the accompanying drawings and examples below. In the drawings, identical or similar reference numerals refer to identical or similar elements or functionally identical or similar elements. Obviously, the described embodiments are for only some embodiments of the present application, but not all the embodiments. Based on the embodiments in the present application, all other embodiments obtained by those skilled in the art without any creative efforts belong to the scope of protection of the present application.

In the description of the present application, the orientations or positional relationships indicated by the terms "center", "longitudinal", "lateral", "front", "rear", "left", "right", "vertical", "horizontal", "top", "bottom", "inner", "outer" and the like are based on the those shown in the drawings and are merely for the convenience of describing the embodiments of the present application and simplifying the description, rather than indicating or implying that the referenced devices or elements must have a specific orientation, or be constructed and operated in a specific orientation, and therefore cannot be understood as a limitation to the protection scope of the embodiments of the present application.

Figure 1:
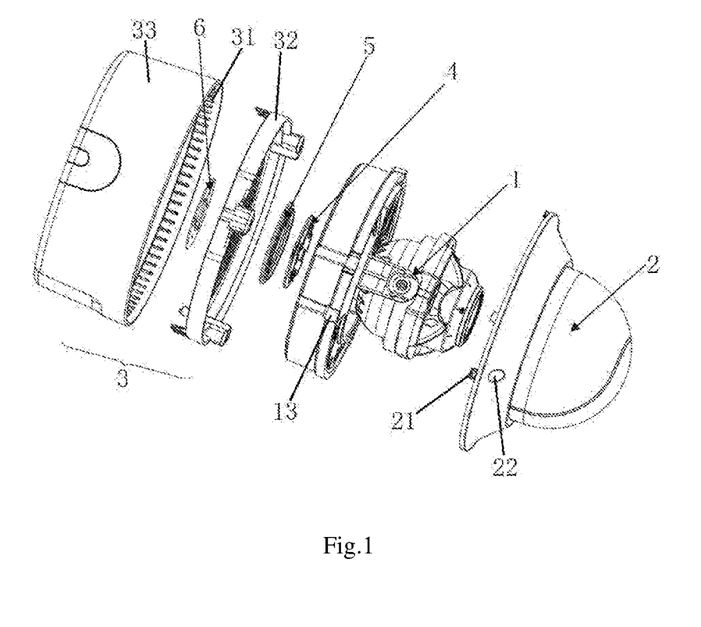
FIG. 1 is an exploded schematic diagram of an embodiment of a video camera provided by the present application.
Figure 2:
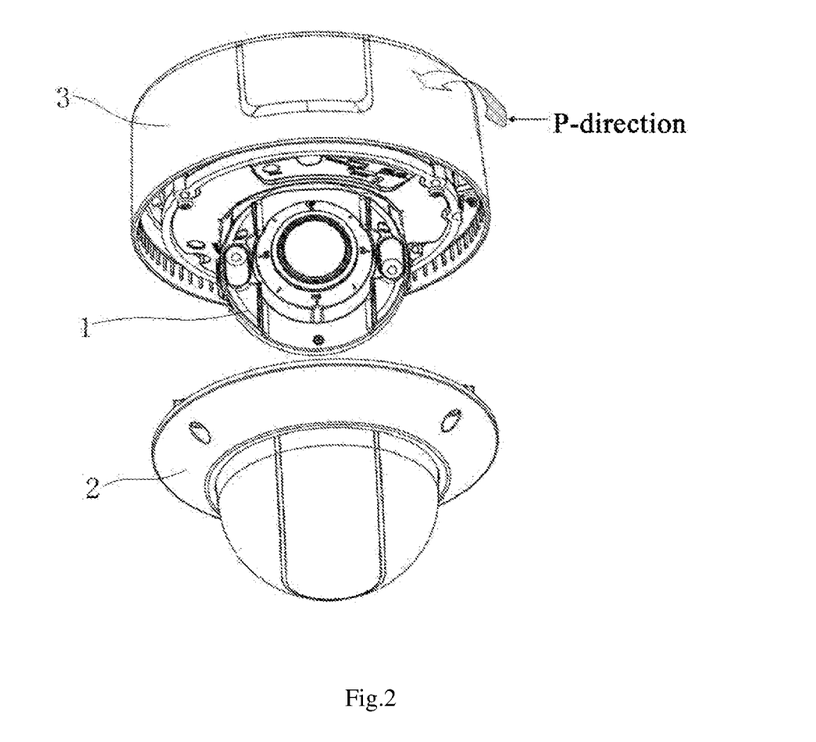
FIG. 2 is a schematic diagram of the video camera of FIG. 1, with a base and a lens assembly assembled together.
Figure 7:
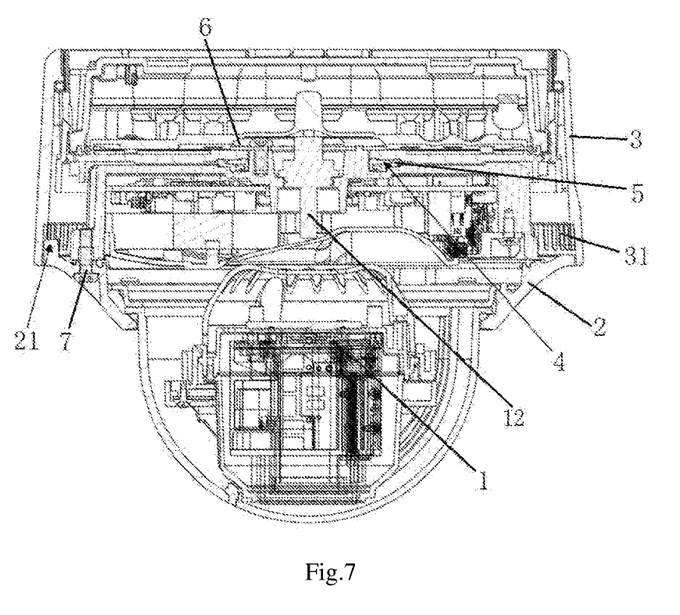
FIG. 7 is a schematic cross-sectional view of the video camera of FIG. 1.

As shown in FIGS. 1, 2 and 7, the video camera provided by the present embodiment includes a lens assembly 1, an upper shell assembly 2 and a lower shell assembly 3.

Wherein, the lens assembly 1 can adjust its own "pan direction" (0-360 degrees) and "pitch direction" manually or electrically to set an angle range of a camera lens direction. "Pan direction" is a direction in which the lens assembly 1 rotates about a shaft 12 (as shown in FIG. 7), i.e., the P-direction mentioned in the present application.

The upper shell assembly 2 may include a cover, made of transparent material, covering the lens assembly 1. The upper shell assembly 2 is fixedly connected to the lens assembly 1 by a fastener (such as a screw 7, as shown in FIG. 7), and the lens assembly 1 is provided on the lower shell assembly 3 so as to be rotatable in P-direction. Thus, the shell assembly 2 and the lens assembly 1 can rotate together in the P-direction relative to the lower shell assembly 3.

The upper shell assembly 2 is provided with a first protrusion 21, the lower shell assembly 3 is provided with a second protrusion 31, and the first protrusion 21 and the second protrusion 31 are press-fitted to each other so as to limit the rotation of the lens assembly 1 relative to the lower shell assembly 3 in the P-direction. When the first protrusion 21 is detached from the second protrusion 31, the lens assembly 1 and the upper shell assembly 2 can rotate together in the P-direction relative to the lower shell assembly 3.

According to the present embodiment, for rotation adjustment of the lens assembly 1 in P-direction, firstly the first protrusion 21 is moved away from the second protrusion 31 in the direction of the shaft 12, so as to detach the first protrusion 21 from the second protrusion 31. During the above process, the upper shell assembly 2 and the lens assembly 1 can still be connected together. Then, the lens assembly 1 and the upper shell assembly 2 are rotated in the P-direction to a target direction, i.e., the upper shell assembly 2 and the lens assembly 1 can rotate in the P-direction relative to the lower shell assembly 3. In this process, the first protrusion 21 is directly detached from the second protrusion 31, so that a rotation adjustment of the lens assembly 1 in P-direction can be realized without removing the upper shell assembly 2 from the lens assembly 1, which is convenient to operate.

In one embodiment, the first protrusion 21 includes first teeth spaced apart in the circumferential direction of the upper shell assembly 2, and the second protrusion 31 includes second teeth spaced apart in the circumferential direction of the lower shell assembly 3, and these first and second teeth are press-fitted to each other through engagement. By detaching the first teeth from the second teeth, the lens assembly 1 and the upper shell assembly 2 can rotate together in the P-direction relative to the lower shell assembly 3. The locking and adjustment between the lens assembly 1 and the lower shell assembly 3 is realized by means of teeth engagement in the present embodiment, and the tooth structure is convenient to engage and disengage, easy to operate, and is highly reliable. Further, the process of manufacturing the teeth is relatively simple and the cost is low.

In one embodiment, there are at least two first teeth. An interval between adjacent two of said second teeth is set to be greater than the width of one of said first teeth and less than the sum of the widths of two of said first teeth, so as to accommodate one of said first teeth.

In one embodiment, three of said first teeth are uniformly spaced circumferentially on the bottom of the upper shell assembly 2, and said second teeth are disposed on an inner surface of a side wall of the lower shell assembly 3. This is suitable for the case where the upper shell assembly 2 is covered by the side wall of the lower shell assembly 3. Of course, said second teeth may also be disposed on other parts of the lower shell assembly 3 as long as said first teeth can be easily engaged with or detached from said second teeth.

As shown in FIG. 1, in one embodiment, the lower shell assembly 3 includes a base 32 and a lower shell 33. The inner surface of the lower shell 33 is fixedly connected to the lower surface of the base 32, and the second protrusion 31 is provided on the inner surface of the side wall of the lower shell 33, which is higher than a portion of the base 32. The lens assembly 1 is provided on the upper surface of the base 32 so as to be rotatable in the P-direction. Wherein, the surface away from the lens assembly 1 is referred to as "lower surface", and the surface closer to the lens assembly 1 is referred to as "upper surface".

As shown in FIGS. 3 to 7, in one embodiment, the P-direction adjustment mechanism of said video camera further includes a rotating support frame 4, which has a body, and a mounting portion 41 and an elastic arm 42 provided on the body. Wherein the mounting portion 41 is fixedly connected to the lower surface of the lens assembly 1, and the elastic arm 42 extends in P-direction to form a free end with a projection 421. Optionally, the body of the rotating support frame 4 has a ring shape, of which an inner ring is provided with the mounting portion 41 and an outer ring is provided with the elastic arm 42. Wherein, the mounting portion 41 is a lug with a through hole, a plurality of lugs are disposed at intervals along the inner ring of the body, and thus the rotating support frame 4 can be fixedly connected to the lower surface of the lens assembly 1 by inserting the screw into the through hole in the lug. Therefore, when the lens assembly 1 is rotated in P-direction, the rotating support frame 4 and the lens assembly 1 still remain fixedly connected in the P-direction and in a direction of the center line of the shaft 12. The elastic arm 42 is similar to a cantilever arm, of which one end is fixed and the other end is a free end in a suspended state. In the present embodiment, three elastic arms 42 are provided at intervals along the outer ring of the body.

Figure 5:
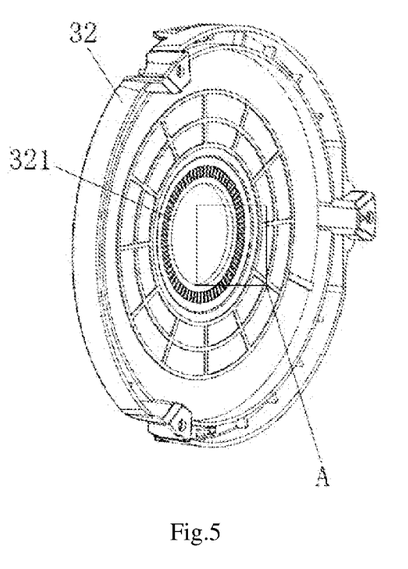
FIG. 5 is a schematic structural diagram of the base of the video camera of FIG. 1.
Figure 6:
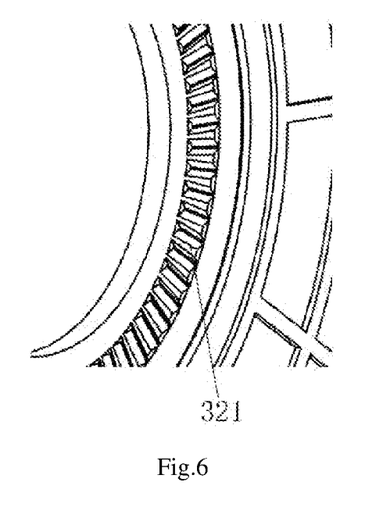
FIG. 6 is a partially enlarged schematic diagram of a portion A in FIG. 4.

Circumferential teeth 321 are provided on the upper surface of the base 32. The circumferential teeth 321 are frictionally engaged with the projection 421 to limit the rotation of the lens assembly 1 in P-direction relative to the base 32. Thus, when the first protrusion 21 and the second protrusion 31 are press-fitted to each other so as to limit the rotation of the lens assembly 1 in the P-direction relative to the lower shell assembly 3, the circumferential teeth 321 and the projection 421 are frictionally engaged, which would limit to some extent the rotation of the lens assembly 1 in P-direction relative to the lower shell assembly 3. It is able to effectively prevent said lens assembly 1 from shaking due to that the interval between adjacent two of the second teeth is greater than the width of one of the first teeth. However, when the lens assembly 1 or the upper shell assembly 2 is driven by a P-direction force exerted thereon as soon as the first protrusion 21 is detached from the second protrusion 31, the circumferential teeth 321 allow the projection 421 to be detached from an gap between two adjacent circumferential teeth 321, which enables the lens assembly 1 to rotate in the P-direction relative to the lower shell assembly 3. The elastic arm 41 is subjected to a force from the base 32 when the lens assembly 1 is rotated in the P-direction, so that the frictional engagement, i.e., the damping, between the elastic arm 41 and the circumferential teeth 321 can be felt by hand, which provides a good hand feeling.

As shown in FIGS. 1 and 7, in one embodiment, the P-direction adjustment mechanism of said video camera further includes an elastic sealing ring 5, which is disposed between the lens assembly 1 and the base 32, and a pressing force in the direction of the center line of the shaft 12 is provided by the rotating support frame 4 and the base 32, so as to prevent water in the base 32 from entering the lens assembly 1 via the lens assembly 1 and the base 32. The elastic sealing ring 5 may be made of waterproof silica with elasticity, which exhibits fairly good sealing effect as the base 32 presses the elastic sealing ring 5 in the direction of the center line of the shaft 12.

Figure 3:
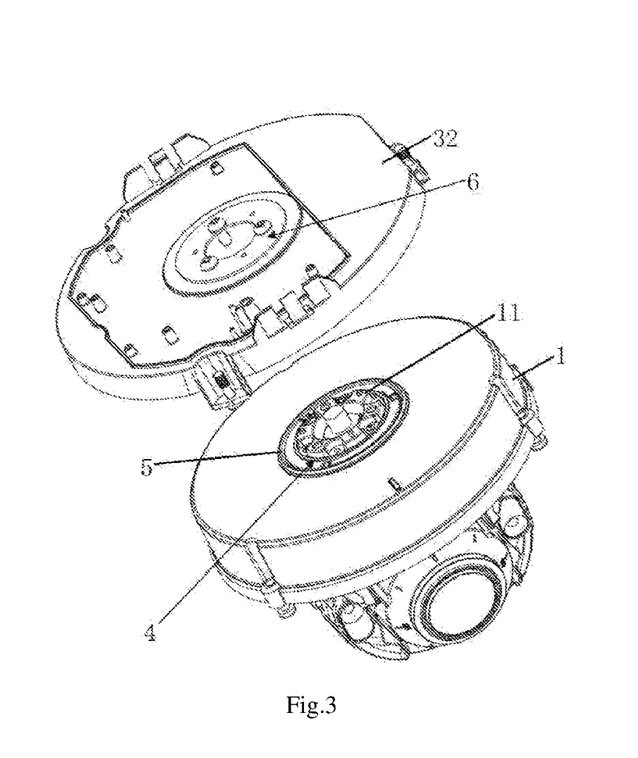
FIG. 3 is a schematic assembly diagram illustrating an of a base and a lens assembly of the video camera of FIG. 1.
Figure 4:
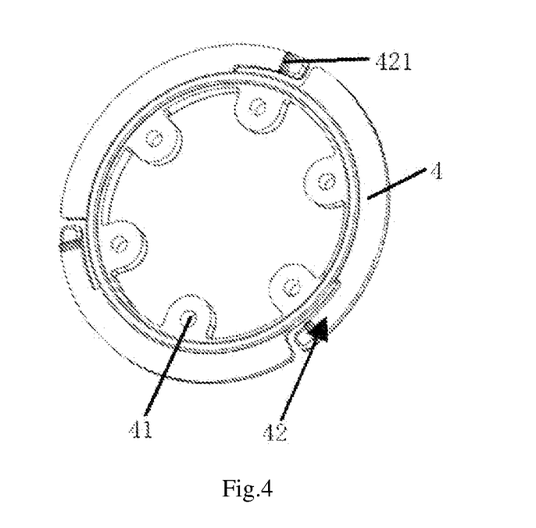
FIG. 4 is a schematic structural diagram of a rotating support frame of the video camera of FIG. 1.

As shown in FIGS. 3 and 7, in one embodiment, a base mounting portion 11 is provided on the lower surface of the lens assembly 1, and the rotating support frame 4 is sleeved outside the base mounting portion 11. The P-direction adjustment mechanism of said video camera includes a pressing plate 6, which is disposed on the lower surface of the base 32 and fastened on the base mounting portion 11 by means of a screw, the base 32 can be fixed relative to the lens assembly 1 in the direction of the center line of the shaft 12 by means of a screw, while the freedom degree of the lens assembly 1 relative to the base 32 in P-direction is retained. During assembly, the elastic sealing ring 5 is sleeved outside the base mounting portion 11, then compressed by the rotating support frame 4, and finally compressed and fixed by the base 32 for the second time. Both the rotating support frame 4 and the base 32 provide a pressing force in the direction of the center line of the shaft 12. As the base 32 is fixed on the lens assembly 1, three parts (i.e., the elastic sealing ring 5, the rotating support frame 4 and the base 32) have a certain thickness, and the base mounting portion 11 protrudes from the rotating support frame 4 to compensate for the thickness of these three parts, which further facilitates the pressing plate 6 to ultimately fix the entire structure by means of a screw.

In one embodiment, the upper shell assembly 2 is provided with a plurality of threaded holes 22 in the direction of the center line of the shaft 12, and these threaded holes 22 are circumferentially spaced around the upper shell assembly 2. Accordingly, the lens assembly 1 is provided with a threaded hole structure 13. Therefore, the screw 7 passes through the threaded hole structures of the upper shell assembly 2 and the lens assembly 1 in sequence, and the screw 7 is tightened so that the upper shell assembly 2 and the lens assembly 1 are fixedly connected.

For rotation adjustment of the lens assembly 1 in P-direction, firstly the screw 7 is loosened to some extent without being detached from the upper shell assembly 2 and the lens assembly 1. In this way, the upper shell assembly 2 and the lens assembly 1 are still fixedly connected in the P-direction and in the direction of the center line of the shaft 12. After the screw 7 is loosened, the upper shell assembly 2 moves away from the lens assembly 1 in the direction of the center line of the shaft 12, during which the lower shell assembly 3 and the lens assembly 1 are still fixedly connected in the direction of the center line of the shaft 12 while they have a freedom degree in the P-direction, thus after the first protrusion 21 is detached from the second protrusion 31 in the direction of the center line of the shaft 12, it is possible for the lens assembly 1 and the upper shell assembly 2 to rotate together in the P-direction relative to the lower shell assembly 3 without removing the upper shell assembly 2 from the lens assembly 1, which makes the P-direction adjustment easier and more convenient.

The foregoing embodiments are merely used to illustrate rather than to limit the technical solutions of the present application. It will be appreciated by those of ordinary skill in the art that modifications can be made to the technical solution recited in the foregoing embodiments, or equivalent substitutions can be made to some parts thereof. Any modifications, equivalent substitutions, and improvements and the like that are made within the spirit and principle of the present application shall be included in the protection scope of this application.

What is claimed is:

1. A video camera, comprising a lens assembly, an upper shell assembly and a lower shell assembly, the upper shell assembly covering the lens assembly;

wherein, the lens assembly is fixedly connected to the upper shell assembly, and both the lens assembly and the upper shell assembly are provided on the lower shell assembly so as to be rotatable in Pan-direction, and the upper shell assembly is provided with a first protrusion, and the lower shell assembly is provided with a second protrusion, and the first protrusion and the second protrusion are press-fitted to each other so as to limit the rotation of the lens assembly in the Pan-direction relative to the lower shell assembly, wherein, the first protrusion comprises first teeth spaced apart in a circumferential direction of the upper shell assembly, and the second protrusion comprises second teeth spaced apart in a circumferential direction of the lower shell assembly, and the first teeth and the second teeth are press-fitted to each other through engagement, and wherein, there are at least two first teeth, and an interval between adjacent two of the second teeth is set to be greater than a width of one of the first teeth and less than the sum of the widths of two of the first teeth.

2. The video camera according to claim 1, further comprising a Pan-direction adjustment mechanism, wherein, three of the first teeth are uniformly spaced circumferentially on a bottom of the upper shell assembly, and the second teeth are disposed on an inner surface of a side wall of the lower shell assembly.

3. The video camera according to claim 1, wherein, the lower shell assembly comprises a base and a lower shell, and the lower shell is fixedly connected to a lower surface of the base, and the second protrusion is provided on an inner surface of a side wall of the lower shell, and the lens assembly is provided on an upper surface of the base so as to be rotatable in the Pan-direction.

4. The video camera according to claim 3, wherein, circumferential teeth are provided on the upper surface of the base;

the video camera further comprises a rotating support frame that comprises a mounting portion and an elastic arm;

the mounting portion is fixedly connected to a lower surface of the lens assembly; the elastic arm extends in the P-direction to form a free end with a projection;

the circumferential teeth are frictionally engaged with the projection, and when the lens assembly or the upper shell assembly is driven by a Pan-direction force exerted thereon, the circumferential teeth allow the projection to be detached from an gap between two adjacent circumferential teeth, which enables the lens assembly to rotate in the P-direction relative to the lower shell assembly.

5. The video camera according to claim 4, further comprising an elastic sealing ring that is disposed between the lens assembly and the base, and a pressing force in a direction of a center line of a shaft is provided by the rotating support frame and the base, so as to prevent water in the base from entering the lens assembly via the lens assembly and the base.

6. The video camera according to claim 5, wherein, a base mounting portion is provided on the lower surface of the lens assembly, and the rotating support frame is sleeved outside the base mounting portion that protrudes from the rotating support frame;

the Pan-direction adjustment mechanism of the video camera further comprises a pressing plate, which is disposed on the lower surface of the base and fastened on the base mounting portion by means of a screw.

7. The video camera according to claim 1, wherein, the upper shell assembly is a transparent cover, whose peripheral edge is fixedly connected to the lens assembly by means of a screw.

\* \* \* \* \*